Dec. 18, 1928.
A. C. BALLY
1,695,943
SPRING SHACKLE
Filed June 29, 1925
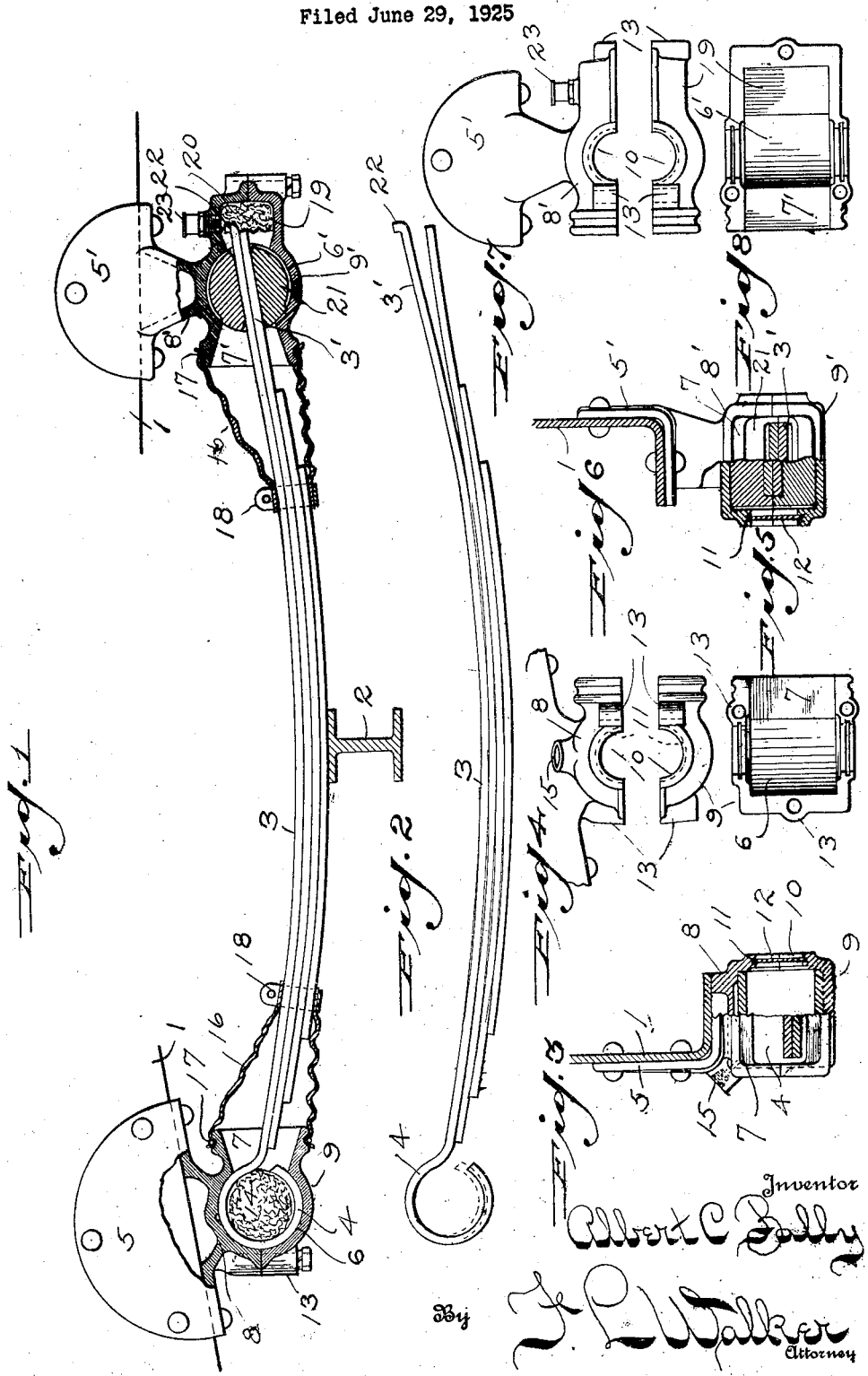

Patented Dec. 18, 1928.

1,695,943

UNITED STATES PATENT OFFICE.

ALBERT C. BALLY, OF TOLEDO, OHIO.

SPRING SHACKLE.

Application filed June 29, 1925. Serial No. 40,183.

My invention relates to vehicle springs and more particularly to shackle connections for yieldingly connecting the ends of the spring with a vehicle body.

Whereas it is customary to compensate for the elongation of vehicle springs when under tension by providing swinging or pivotally mounted shackle links, in the present invention there is contemplated as a substitute for such swinging links, a reciprocatory or sliding connection of the spring member within an oscillatory or rocking bearing. This rocking bearing is preferably formed by two substantially semicylindrical blocks contained within a housing bracket, and located on opposite sides of the reciprocatory spring member. The spring is of the usual multiple leaf type, the engaged portions of adjacent leaves being formed in divergent relations, so that they are held under tension between the oscillatory guide blocks. The extremity of one leaf is upturned to form a limiting stop. The lubricant pad is confined within the bracket housing and a flexible boot encloses and protects the adjacent portions of the spring leaf. While this sliding form of shackle connection may be employed at both ends of the spring, the preferable construction is to provide at the driving end a limited oscillatory connection, by forming one of the spring leaves into a circular eye, which is confined under retractive tension in a second housing bracket attached to the vehicle chassis. A lubricant pad and protective boot are provided for such oscillatory driving connection, as before described.

The object of the invention is to simplify the construction, as well as the means and mode of operation of spring shackle connections, whereby they will not only be cheapened in construction, but will be more efficient in operation, uniform in action, readily responsive to variations of spring tension and unlikely to get out of repair.

A further object of the invention is to provide a compensating shackle connection, which will automatically adjust itself to inequalities of manufacture and wear of parts and will prevent vibration or rattle of the connecting members.

A further object of the invention is to provide efficient lubricating means for the compensating shackle connection.

A further object of the invention is to provide a shackle construction which will be of compact form, possessing extensive bearing surfaces, and which will operate quietly.

With the above primary and other incidental objects in view as will more fully appear in the specification, the invention consists of the features of construction, the parts and combinations thereof, and the mode of operation or their equivalents as hereinafter described and set forth in the claims.

In the accompanying drawing wherein is shown the preferred, but obviously not necessarily the only form of embodiment of the invention, Fig. 1 is a side elevation of a vehicle spring suspension, embodying the present invention, wherein the spring mountings are shown in section. Fig. 2 is a detail side elevation of the vehicle spring removed from the mounting. Fig. 3 is an end elevation partly in section of the oscillatory or driving end mounting, shown at the left of Fig. 1. Fig. 4 is a side elevation of the bracket housing, separated into its component parts, and Fig. 5 a plan view of the lower half or cap portion of such housing bracket for the oscillatory or driving end connection of the spring. Fig. 6 is an end elevation similar to Fig. 3, partly in section of the mounting bracket and connection for the compensating or sliding end of the spring. Fig. 7 is a detail side elevation of the bracket or housing for the sliding end of the spring separated into its component parts and Fig. 8 is an interior plan view of the cap portion thereof.

Like parts are indicated by similar characters of reference throughout the several views.

In the accompanying drawings, 1 indicates the body or chassis frame of a vehicle and 2 the axle thereof, upon which the spring 3 rests. The spring 3 is of the usual type of multiple leaf spring in which a number of leaves or strips of spring material of different length are superposed one upon the other. The driving end of the spring which may be the front end of a rear spring or either the front or rear end of a front spring of a vehicle is formed with an open circular eye 4, at the end of the topmost and longest leaf of the spring. This eye 4 is enclosed within a housing bracket, having therein a circular chamber to which the eye 4 conforms and from which extends a flaring vestibule affording clearance for oscillatory movement of the spring leaves, within the mounting. The mounting bracket is formed in two separable portions, the upper portion 8 carries a flange 5, of any suitable shape to conform to the particular part of the vehicle chassis to which this bracket is to be attached. The main bracket portion 8 and the cap or bottom portion 9 are provided with registering semi-circular depressions which form the chamber 6, at each end of which is formed a semi-circular notch or recess 10. This notch or recess 10 is not essential to the operation of the mounting or the shackle construction, but is found of great convenience during manufacture in that it provides clearance space for the spindle or mandrel of a milling cutter employed in machining the interior of the semi-circular recesses of the respective bracket parts, forming the chamber 6. The interior margins of these terminal notches or recesses 10 in the respective members are formed with grooves 11 to receive the margin of a closure or sealing disc 12. The circular eye 4 is normally of greater diameter than that of the chamber 6, within which it is to be received. The attachment of the cap member 9 to the main bracket member 8 by means of bolts through the lugs 13, serves to place the eye 4 under tension compressing it to the diameter of the chamber 6. In Fig. 2 the eye 4 has been shown by solid lines in its normal or expanded size and by dotted lines the contracted size to which it is compressed by its engagement within the circular chamber 6 of the mounting bracket. By thus being placed under compression, the eye 4 has a tendency to expand within the chamber 6 of the bracket and to automatically compensate for wear or for inaccuracies of adjustment or manufacture of the parts. The comparatively wide mouth of the vestibule portion 7 of this mounting bracket permits an ample range of oscillatory adjustment of the spring relative to the mounting bracket. Thus when submitted to deflection the spring possesses a pivotal movement of the eye 4, within the chamber 6 of the mounting. To afford lubrication and minimize wear, a felt plug or pad 14 is located interiorly of the eye 4 and is kept saturated with lubricant introduced through the duct 15 of the mounting. A flexible boot or hood 16 is secured by the clamp ring 17 engaging within a groove exteriorly surrounding the vestibule portion 7 of the mounting. At its opposite end the boot is secured to the spring 3 by clamp collars 18. This boot is preferably made of leather although other flexible material may be utilized. Its purpose is to exclude dust and dirt and to prevent evaporation and drying of the lubricant or oil. It also tends to direct the oil downward between the leaves of the spring thus keeping the spring properly lubricated.

At the opposite ends of the spring 3 there is shown a compensating mounting, by which the spring is permitted a to and fro sliding or reciprocatory movement in accordance with its deflection under tension. This sliding form of compensating connection is preferably applied to the rear end of the rear spring, or to either the front or rear end of a front spring of the vehicle. A similar type of housing bracket is employed, consisting of a main or primary section 8′, having a wing a flange or other suitable means for connecting the bracket to the frame or chassis of a vehicle, and a separable cap portion 9′, connected to the main portion of the bracket by clamp bolts in quite the same manner as previously described. This mounting bracket is formed with a similar circular chamber 6′, from which extends a flaring vestibule 7′. The bracket for the sliding end of the spring is extended, however, in a direction opposite to the vestibule 7′, sufficient to afford a chamber 19, to receive a lubricant pad 20. The chamber 6′ of this mounting comprises two semi-circular recesses in the respective bracket parts, the parts having similar semi-circular notches provided with internal marginal grooves, to receive closure discs 12, as before described.

Located within the circular chamber 6′ are two arcuate bearing blocks 21, agreeing with the interior contour of the chamber 6′, and of slightly less than semi-circular form to afford therebetween sufficient intermediate space for the extension of the two uppermost leaves or blades of the spring 3. The extensions 3′ of these spring blades or leaves are capable of longitudinal sliding adjustment between the arcuate bearing blocks 21 to compensate for the elongation of the spring when under tension. Normally the ends 3′ of the spring leaves are somewhat divergent as shown in Fig. 2. These divergent ends of the leaves are pressed together under tension, between the bearing blocks 21, upon which they exert a constant outward pressure serving to automatically take up any lost motion and prevent any looseness or rattle of the connection. The end of one of these leaves is upturned or bent laterally as at 22 to form a limiting stop, preventing withdrawal of the leaves from the bearing blocks 21. The flexing movement of the spring 3 incidental to vertical vibration of the chassis frame 1, not only induces a reciprocatory or sliding movement of the end 3′ of the leaves intermediate the bearing blocks 21, but it also involves a slight oscillatory or rocking movement of the bearing block 21, within the bracket housing or chamber 6′. Upon each endwise or sliding movement of the leaves of the spring intermediate the bearing blocks 21, the ends of such spring leaves tend to compress the lubricant pad 20 within the chamber 19, causing the lubricant to be exuded in small quantities to supply the bearing surfaces of the spring and bearing blocks. Lubricant is supplied to the chamber 19 and 20 through an oil cup or other lubricant supply inlet 23. A protective boot as before described is provided for this bearing, as well as the bearing at the opposite end of the spring.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described my invention, I claim:

1. In a spring suspension for vehicles, a leaf spring having at one end thereof, a circular eye, a mounting bracket having therein a circular socket of less diameter than the normal diameter of the eye in which the eye of the spring is enclosed under compression for relative locking movement, said mounting bracket having closure heads at opposite sides of the spring and serving to close the eye of such spring, and a compensating connection for the opposite end of the spring accommodating the extension and contraction of the spring under varying load tension.

2. In a spring suspension for vehicles and the like, a leaf spring, having at one end thereof a circular eye capable of contraction and expansion, a mounting bracket having therein a socket in which the eye of the spring is enclosed, for relative rocking movement, the interior dimension of the socket being less than the normal dimension of the eye whereby the eye is held under compression within the socket, and a variable connection for the opposite end of the spring compensating for elongation and contraction of the spring under varying load tension.

3. In a spring suspension for vehicles and the like, including a leaf spring having at one end an expansible and contractible head, a mounting bracket having therein a socket in which the head is engaged under compression whereby the inherent expansion of the head will compensate for wear and inequalities of the parts.

4. In a spring suspension for vehicles and the like, the combination with a spring member having a substantially cylindrical head, thereon, of a mounting bracket comprising two separable sections each having therein a substantially semi-cylindrical recess registering with each other, and means for interconnecting the sections to compress therebetween and within said registering recesses the cylindrical head of said spring.

5. In a spring suspension for vehicles and the like, a leaf spring, a sliding bearing for one end of the spring, the leaves of the spring extending thru said sliding bearing being divergently disposed and compressed one toward the other against the inherent tension of the leaves whereby they exert opposite pressure within the sliding bearing to automatically compensate for wear and inequalities of the parts.

6. In a spring suspension for vehicles and the like, a leaf spring, a pair of arcuate bearing blocks between which the end of the spring is mounted for sliding movement, means whereby the arcuate bearing blocks are subjected to separating influence, and a mounting bracket having therein a socket in which the arcuate bearing blocks are enclosed for limited rocking movement.

7. In a spring suspension for vehicles, a leaf spring having a transversely expansible extremity, a pair of substantially semi-cylindrical bearing blocks located on opposite sides of the spring extremity, between which the transversely expansible spring extremity is capable of to and fro sliding movement, and a mounting bracket having therein a socket enclosing the bearing blocks in which the blocks are subjected to the intermediate spring expansion of said expansible spring extremity and within which the blocks are capable of a limited oscillatory movement.

8. In a spring suspension for vehicles and the like, a leaf spring, a pair of substantially semi-cylindrical bearing blocks between which the extremities of adjacent leaves of the spring extend, said extremities being subjected to tension by which they tend to press the bearing blocks apart, and a mounting bracket having therein a socket in which the bearing blocks are confined for oscillatory movement to compensate for deflection of the spring.

In testimony whereof, I have hereunto set my hand this 29 day of May, A. D. 1925.

ALBERT C. BALLY.